United States Patent
Smock et al.

[19]

[11] Patent Number: 5,993,011
[45] Date of Patent: Nov. 30, 1999

[54] PROJECTOR MOUNT SYSTEM

[76] Inventors: Franklin Smock, 3680 Lisa La., Plainfield, Ind. 46168; Randall Shoemaker, 9630 Shoal Creek La., Brownsburg, Ind. 46112

[21] Appl. No.: 09/048,210

[22] Filed: Mar. 26, 1998

[51] Int. Cl.⁶ ................................................. G03B 21/14
[52] U.S. Cl. ............................... 353/119; 353/99; 353/58
[58] Field of Search ..................... 353/119, 121, 353/71, 72, 73, 77, 78, 61, 79, 98, 99, 57, 58, 60; 352/242, 243

[56] References Cited

U.S. PATENT DOCUMENTS

| | | | |
|---|---|---|---|
| 3,488,115 | 1/1970 | Nemec et al. | 353/99 |
| 3,645,531 | 2/1972 | Wright | 273/138 |
| 3,807,847 | 4/1974 | Okano | 353/71 |
| 4,003,644 | 1/1977 | Aruanno | 352/72 |
| 4,114,291 | 9/1978 | Taub | 35/36 |
| 4,160,999 | 7/1979 | Claggett | 358/108 |
| 4,348,187 | 9/1982 | Dotsko | 434/44 |
| 4,639,106 | 1/1987 | Gradin | 353/13 |
| 4,750,832 | 6/1988 | Lloyd, Sr. et al. | 352/243 |
| 5,123,728 | 6/1992 | Gradin et al. | 353/78 |
| 5,584,554 | 12/1996 | Moore et al. | 353/122 |
| 5,622,417 | 4/1997 | Conner et al. | 353/69 |
| 5,836,664 | 11/1998 | Conner et al. | 353/70 |

*Primary Examiner*—William Dowling
*Attorney, Agent, or Firm*—Daniel J. O'Connor

[57] ABSTRACT

A video projector mount system which is positioned within a ceiling grid. The projector is within a housing which includes mirrors to convey a video image to a screen. A supply of ventilating and cooling air for the projector is provided to efficiently cool the projector so it may be used in the ceiling location. The overall system provides security from theft or tampering and a pleasing aesthetic appearance.

1 Claim, 1 Drawing Sheet

PROJECTOR MOUNT SYSTEM

BACKGROUND AND OBJECTS OF THE INVENTION

The present invention is generally related to the video projector mounting arts and, in particular, to a system and method for mounting video projectors from the ceiling of a room.

Retractable-type ceiling mounted video projectors have been used in the art.

In such systems, the projector in its raised position is protected from dust and tampering by being contained within a ceiling chamber.

To use the projector, it is lowered by motor drive means to a desired position.

While such systems have proven to be very effective and commercially viable in the art, the requirement to move the projector and the provision of relatively larger motor drive means to effect such motion has proven to be rather costly in the art.

Accordingly, it is an object of the present invention to provide a ceiling mounted and contained video projector system wherein the projector itself need not be moved to a lower position.

It is a further object of the invention to set forth a ceiling mounted video projector system which includes plural reflective mirrors, one of which is moved to a lower operating position when desired.

It is also an object of the invention to demonstrate a ceiling-contained video projector system which includes a cooling and ventilating fan means for the projector compartment.

It is a still further object of the invention to show a ceiling mounted video projector system which may be built, operated and maintained in a cost-effective manner.

These and other objects and advantages of the present invention will be apparent to those of skill in the art from the description which follows.

PRIOR ART PATENTS AND DESIGNS

U.S. Pat. No. 4,750,832 illustrates the current state of the art pertaining to ceiling mounted video projector systems.

As described in this patent, a motor drive means is used to lower and raise the video projector relative to the ceiling compartment.

While such systems have performed well in the art, a relatively larger and heavier drive motor is required.

In contrast, the present invention maintains the video projector in a fixed position within a ceiling plenum housing and uses an easily moved system of mirrors to reflect a projected image to a screen. The resulting system is lighter in weight and easier to install and maintain.

BRIEF DESCRIPTION OF THE DRAWING FIGURES

DESCRIPTION OF A PREFERRED EMBODIMENT

Figure 1:
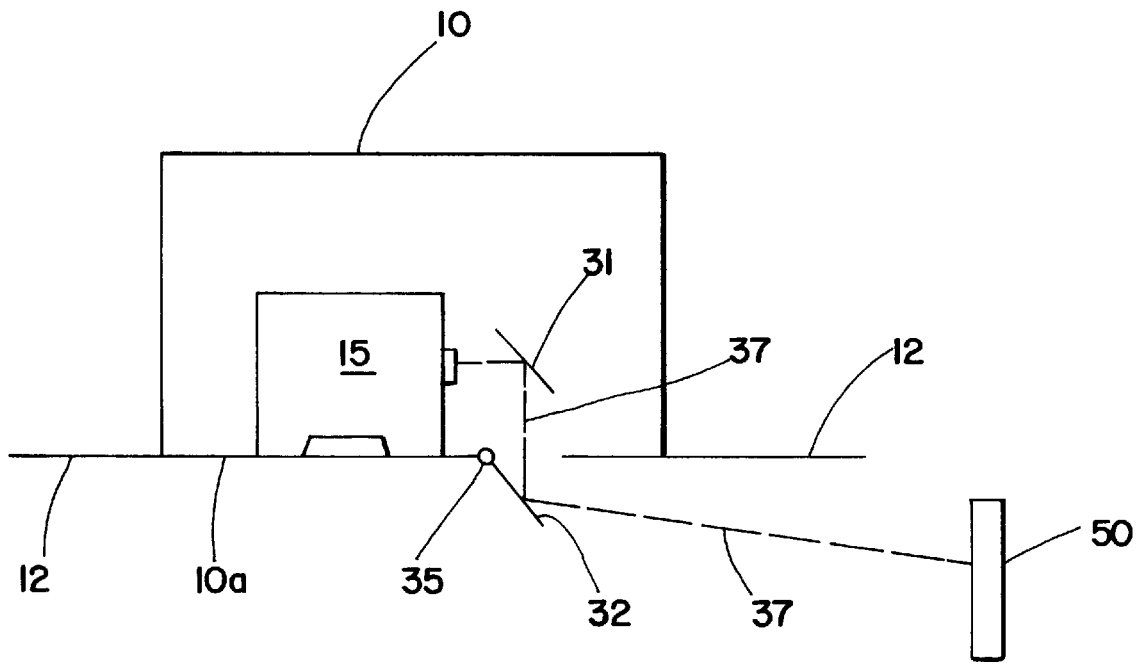
FIG. 1 shows a schematic side view of the mirror components of the system and illustrates the video projector as maintained within a ceiling housing.

Referring to FIG. 1, a housing 10 is shown as formed within a ceiling grid assembly 12 of a room such as a conference room, etc.

A video projector 15 of a type known in the art is mounted within the housing 10 and serves to project an image onto a screen 50.

In typical prior art systems, the projector 15 is lowered beneath the ceiling level 12 via motor drive means.

In accord with the present design, a system of mirrors is used to eliminate the need to lower the video projector.

Mirror 31 is positioned in a fixed but adjustable location.

Mirror 32 is movable via motor 35 from an upper position even with the ceiling grids 12 to a lower position as shown in FIG. 1. Thus, the projected image is reflected along lines 37 to the screen 50 without the need to lower the projector 15.

In practical applications of the invention, the underside of the housing 10a as well as the underside of mirror 32 are fabricated to match the ceiling grids 12 so that the overall unit is effectively hidden for decorative and security purposes.

Figure 2:
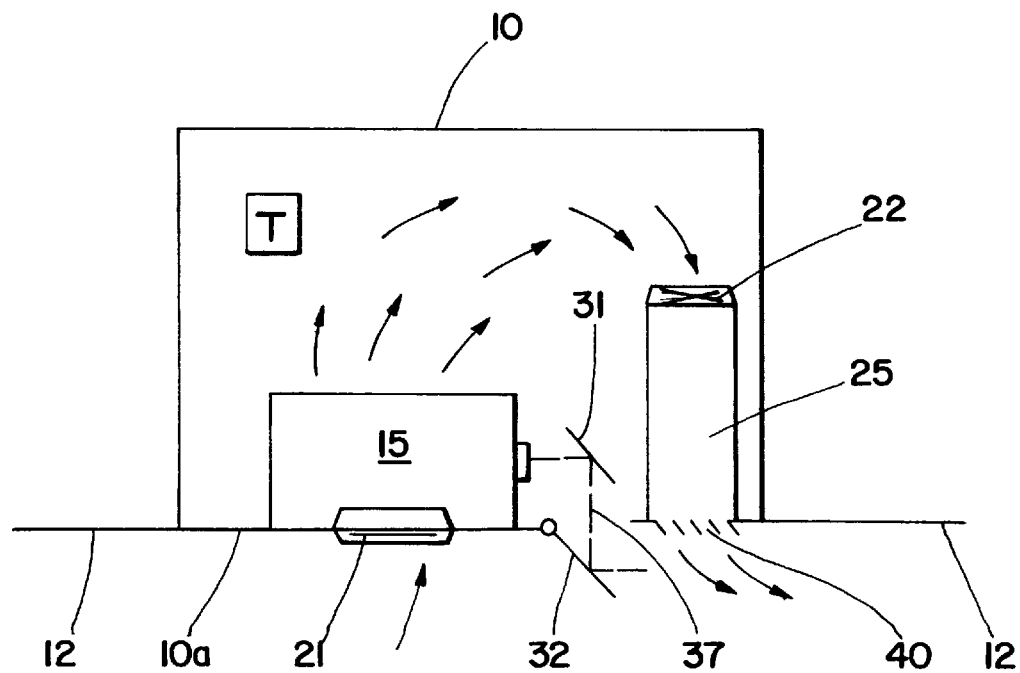
FIG. 2 illustrates the ventilating and cooling aspects of the invention which enable the video projector to be maintained at optimal operating temperatures.

FIG. 2 illustrates the cooling and ventilating aspects of the invention.

As shown, a lower air inlet fan 21 and an exit fan 22 are utilized. If the temperature within housing 10, as sensed by sensor T, reaches 90° F. the fans 21 and 22 are activated to provide a flow of ventilating air over the video projector into the housing 10 and out via the exit ducting 25.

Louvres 40 at the lower end of ducting 25 are designed to direct the warmer air away from the video projector unit 15.

Fans 21 and 22 may comprise 6-inch whisper fan units of a type known generally in the ventilating arts.

Such ventilating system thus allows the video projector to be maintained within the ceiling housing without a risk of possibly damaging heat build-up.

The materials used for the housing and ducting components may comprise lightweight plastics or metals as desired.

The motor 35 used to drive mirror 32 is similarly of lightweight and low horsepower design.

The overall system is thus easy to install and virtually maintenance free. The system is also much lighter as compared to the prior art since heavier projector drive means and motors are not required.

The use of a projector permanently above the ceiling level results in a more secure, tamper-proof, and decorative system.

While a particular embodiment has been shown and described, it is intended in this specification to cover all equivalent designs and methods which would reasonably occur to those of skill in the art.

The invention is further defined by the claims appended hereto.

We claim:

1. A video projector mounting system and means for mounting a projector within a ceiling grid(12) of a room comprising:

a housing(10) for containing and supporting a video projector; and sized to be supported above and upon said ceiling grid(12);

a first fixed mirror(31) mounted within said housing for receiving and reflecting images from said video projector;

a second movable mirror(32) beneath said first mirror for receiving images from said first mirror and reflecting said images to a screen(50);

said second mirror(32) extending downwardly from a lower portion(10*a*) of said housing(10);

a ventilating system comprising a first fan (21) mounted in said housing directly beneath said projector and lying flush with said ceiling grid, a vertical exit duct supported by a lower portion(10*a*) of said housing, a second fan means(22) at an upper part of said exit duct and means for directing exit air away from the projector and housing.

\* \* \* \* \*